United States Patent
Dittrich

(10) Patent No.: US 7,546,189 B2
(45) Date of Patent: Jun. 9, 2009

(54) CONTROLLING OF SECONDARY UNITS

(75) Inventor: Rudolf Dittrich, Obertraubling (DE)

(73) Assignee: Bayerische Moteren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/871,742

(22) Filed: Oct. 12, 2007

(65) Prior Publication Data
US 2008/0033611 A1 Feb. 7, 2008

Related U.S. Application Data

(63) Continuation of application No. PCT/EP2006/002954, filed on Mar. 31, 2006.

(30) Foreign Application Priority Data

Apr. 13, 2005 (DE) .................. 10 2005 016 914

(51) Int. Cl.
*G06F 7/00* (2006.01)
(52) U.S. Cl. .............................. 701/36; 701/1
(58) Field of Classification Search .............. 701/1, 701/36; 307/9.1, 10.1
See application file for complete search history.

(56) References Cited

U.S. PATENT DOCUMENTS

| 4,460,056 A | 7/1984 | Jaccod |
| 5,333,678 A * | 8/1994 | Mellum et al. ............ 165/42 |
| 5,487,278 A * | 1/1996 | Hilleveld et al. ............ 62/236 |
| 5,934,089 A | 8/1999 | Nakagawa et al. |
| 5,991,669 A | 11/1999 | Dominke et al. |
| 6,292,726 B1 | 9/2001 | Gustavsson |
| 6,292,741 B1 | 9/2001 | Bitzer et al. |
| 6,718,214 B1 | 4/2004 | Schoettle et al. |
| 6,941,928 B2 | 9/2005 | Hartmann et al. |

FOREIGN PATENT DOCUMENTS

| DE | 31 04 864 A1 | 8/1982 |
| DE | 197 09 317 A1 | 9/1998 |
| DE | 198 38 333 A1 | 3/2000 |
| DE | 199 60 079 A1 | 6/2000 |
| DE | 101 45 270 A1 | 4/2003 |
| DE | 102 02 353 A1 | 7/2003 |
| DE | 102 32 354 A1 | 1/2004 |
| EP | 1 375 216 B1 | 5/2007 |

OTHER PUBLICATIONS

German Search Report dated Mar. 27, 2006 w/English translation of pertinent portions (nine (9) pages).
International Search Report dated Aug. 4, 2006 w/English translation (six (6) pages).

* cited by examiner

*Primary Examiner*—Yonel Beaulieu
(74) *Attorney, Agent, or Firm*—Crowell & Moring LLP

(57) ABSTRACT

For coordinating the actuation of at least one secondary unit of a motor vehicle which can be driven by a principal unit of the motor vehicle, an acquisition unit acquires limit values for the actuation of the at least one secondary unit and an actual value of resources of the at least one secondary unit, and a decision unit controls the actuation of the at least one secondary unit at least as a function of its limit values and its actual value. Furthermore, a secondary unit for a motor vehicle is provided which can be driven by a principal unit of the motor vehicle and includes an acquisition unit for the acquisition of an actual value of a reserve of resources of the secondary unit.

9 Claims, 2 Drawing Sheets

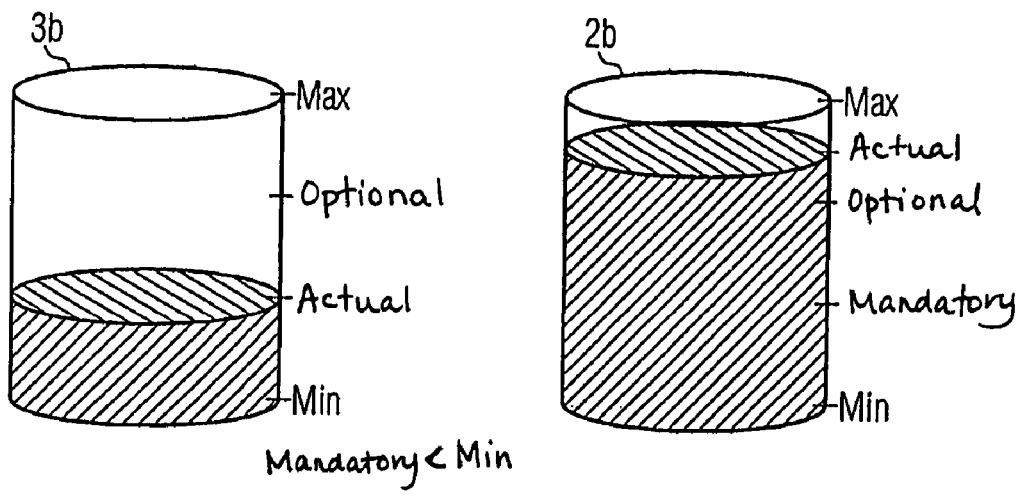
FIG. 2a
FIG. 2b
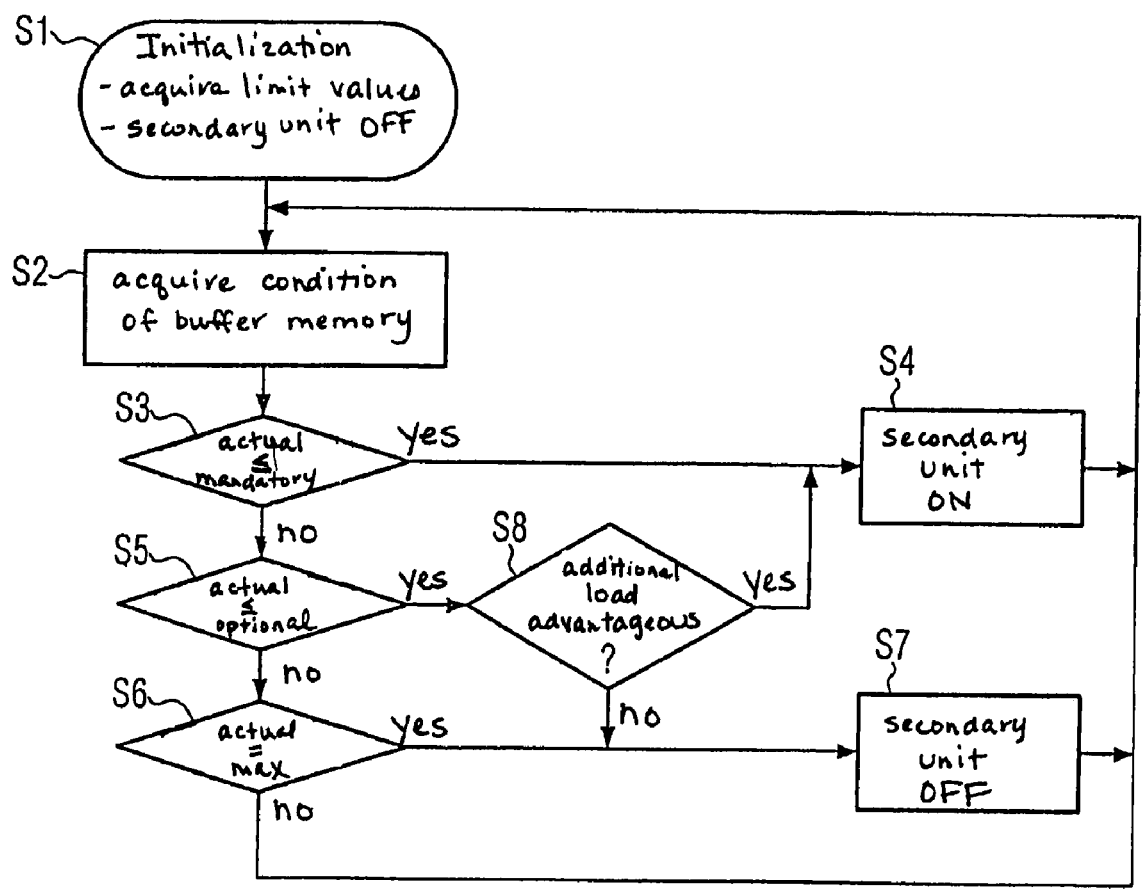
FIG. 3

CONTROLLING OF SECONDARY UNITS

CROSS-REFERENCE TO RELATED APPLICATIONS

This application is a continuation of PCT International Application No. PCT/EP2006/002954, filed on Mar. 31, 2006, which claims priority under 35 U.S.C. § 119 to German Application No. 10 2005 016 914.7, filed Apr. 13, 2005, the entire disclosures of which are expressly incorporated by reference herein.

BACKGROUND AND SUMMARY OF THE INVENTION

The invention relates to coordinating the actuation of secondary units in a motor vehicle. In particular, the invention relates to a control unit and to a process for coordinating the actuation of at least one secondary unit of the motor vehicle, which can be driven by a principal unit, as well as to a secondary unit for a motor vehicle which can be driven by the principal unit of the motor vehicle.

As a result of the rising number of secondary units and the increasing networking of systems in motor vehicles, it has become necessary to develop a so-called torque manager, which coordinates the various torque demands made on the internal-combustion engine of the motor vehicle and provides the desired/permitted torque. In this case, the individual secondary units independently report their respective torque demands that are to be expected.

German Patent documents DE 102 32 354 A1 and DE 198 38 333 A1 describe such systems for controlling the drive of a vehicle where torque demands of main assemblies and secondary units are coordinated and, in which case, a desired actual torque of the drive unit is not influenced by reserve torque demands of external consuming devices and/or secondary units because torque demands or reserve torque demands are correspondingly limited. External consuming devices are, for example, electric consuming devices, such as car radios, electric sliding roofs, etc.; secondary units may, for example, be an air-conditioning compressor, a servo-motor, etc. The absolute reserve torque demands may also be a result of engine functions, such as the idle control.

These systems have in common that torque demands of external consuming devices and/or of secondary units are rejected when necessary so as to satisfy a torque desired by the driver and defined by the driver of the vehicle by operating an accelerator. Since the individual secondary units take over self-sufficient tasks, the demand for a torque of a secondary unit may take place at an unfavorable point in time; thus, for example, at an operating point of the engine which is unfavorable with respect to the efficiency or with respect to the available maximal torque, whereby a rejection of the demand is triggered. In the practical case of a torque demand by the air-conditioning compressor of an air-conditioning system, this means, for example, that no cooling output can be provided at an unfavorable point in time. An operating condition in which the torque change is very sensitive with respect to driving dynamics and can be noticed by the occupant in an unintended/uncomfortable manner is also considered to be unfavorable.

It is, therefore, an object of the invention to provide an alternative system for actuating at least one secondary unit that can be driven by a principal unit of a motor vehicle, which system results in fewer losses of comfort.

According to the invention, this object is achieved by a control unit for coordinating the actuation of at least one secondary unit of a motor vehicle, which can be driven by a principal unit of the motor vehicle, whereby an acquisition unit acquires limit values for the actuation of at least one secondary unit and an actual value from resources of the at least one secondary unit, and a decision unit controls the actuating of the at least one secondary unit as a function of its limit values and its actual value.

Furthermore, this object is achieved according to the invention by a process for coordinating the actuating of at least one secondary unit of a motor vehicle which can be driven by a principal unit of the motor vehicle, by a) acquiring limit values for the actuating of at least one secondary unit and an actual value from resources of at least one secondary unit, and b) controlling the actuating of the at least one secondary unit as a function of its limit values and its actual value.

Finally, this object is achieved according to the invention by a secondary unit of a motor vehicle which can be driven by a principal unit of the motor vehicle. An acquisition unit is provided for acquiring an actual value of a reserve from resources of the secondary unit.

Such a system for coordinating the actuation of at least one secondary unit of a motor vehicle, which can be driven by a principal unit of the motor vehicle, permits the optimal use of torque demands of the secondary unit as a function of the driving condition and simultaneously their reduced rejection because, for actuating a secondary unit, thus the switching-on by way of a defined or definable torque demand or the switching-off, takes place as a function of its resources, so that a storage device of the secondary unit, can, for example, already be replenished before it is absolutely necessary to switch on the secondary unit, therefore before the secondary unit would make a demand request. Not only absolute resources, such as the charge condition of a battery, are considered resources here but also resource reserves, such as a relationship between the charging condition of the battery and an actual power consumption or a predicted power demand.

The limit values of a secondary unit preferably are:

a mandatory value, starting at which the secondary unit has to be switched on when the actual value falls below this mandatory value;

an optional value, which is above the mandatory value, and starting at which the secondary unit may be switched on or off when the actual value falls below this optional value; and a max value, which is greater than or equal to the optional value of the secondary unit, and starting at which the secondary unit should be switched off when the actual value reaches this max value.

In Step (b) noted above, the process according to the invention correspondingly performs such that:

a secondary unit is switched on when its actual value falls below a mandatory value of the secondary unit, a secondary unit may be switched on or off when its actual value falls below an optional value of the secondary unit situated above the mandatory value of the secondary unit, and a secondary unit is switched off when its actual value reaches a max value of the secondary unit which is greater than or equal to the optional value of the secondary unit.

As a result of such a division of limit values of the secondary unit, a range is created which is situated between the mandatory value and the optional value, and in which the secondary unit may be actuated but does not need to be actuated, thus, does not need to be driven by the principal unit of the motor vehicle in order to carry out its function. In the case of an air-conditioning system, this means, for example, that cooling output can still be obtained without requiring the air-conditioning compressor to run. Only when there is a falling below the mandatory value, will the secondary unit no longer be able to carry out its function without a supply of torque. According to the invention, an allocation of torque is therefore not only considered when the secondary unit absolutely needs it, but already starting in a condition in which it makes sense for replenishing resources of the secondary unit. According to the invention, the limit values are individually adjustable for each secondary unit. As an alternative, fixed limits can be set for all secondary units and an individual scaling of the actual value can be provided for each secondary unit.

It is also contemplated that the mandatory value is below a min value, which indicates the minimal resources of the secondary unit, whereby it is indicated that the corresponding secondary unit does not necessarily need to be switched on. In contrast to the generator/battery combination as a secondary unit, this makes sense, for example, in the case of the air-conditioning system as a secondary unit, whereby the latter can be switched off at the expense of the comfort and in favor of the handling characteristics; whereas the battery absolutely does have to be charged starting at a certain mandatory value situated above the discharged condition so that the battery will not be damaged.

Preferably, limit values and actual values of several secondary units are acquired according to the invention (by the acquisition unit) and the actuating of all acquired secondary units is controlled (by the decision unit).

Here, a respective individual controlling of the secondary units or a coordinated controlling of the secondary units can take place, preferably a prioritization of secondary units taking place corresponding to a priority, which is implemented, for example, as a function of a difference between the actual value and the mandatory value of the secondary unit. Such a prioritization has the effect that, when an actual value is between the mandatory value and the optional value of a secondary unit, those secondary units can be operated whose priority is high, and those secondary units can be switched off whose priority is low. The limit between a switching-on and a switching-off of a secondary unit preferably is variable. In addition, it can be defined in a particularly simple manner how much torque is provided to a secondary unit.

Preferably, the condition of the principal unit is acquired according to the invention (by the acquisition unit), and the actuating of the at least one secondary unit is controlled (by the decision unit) corresponding to the condition of the principal unit.

By this embodiment according to the invention, reserves can be formed in the secondary units when the principal unit is not fully utilized, particularly in the case of a demand by the secondary units to be expected. Furthermore, particularly as a result of the combination with a coordinated control of all queried secondary units, an optimal utilization of the principal unit becomes possible with an optimal storage of the resources of the secondary units, whereby a rejection of torque demands of secondary units is almost excluded.

According to the invention, the acquisition unit acquires the actual value of the at least one secondary unit, preferably from a demand buffer and/or limit values of the at least one secondary unit from a limit value memory. Such a demand buffer as well as such a limit value memory are preferably arranged in the corresponding secondary unit; however an arrangement can also take place centrally in a motor vehicle, for example, also in the control unit according to the invention.

Other objects, advantages and novel features of the present invention will become apparent from the following detailed description of the invention when considered in conjunction with the accompanying drawings.

BRIEF DESCRIPTION OF THE DRAWINGS

FIGS. 2a and 2b are detailed views of the demand buffers of the secondary units with the limit values of the secondary units; and FIG. 3 is a flow chart of a preferred embodiment of the process for actuating a secondary unit according to the invention.

DETAILED DESCRIPTION OF THE DRAWINGS

Figure 1:
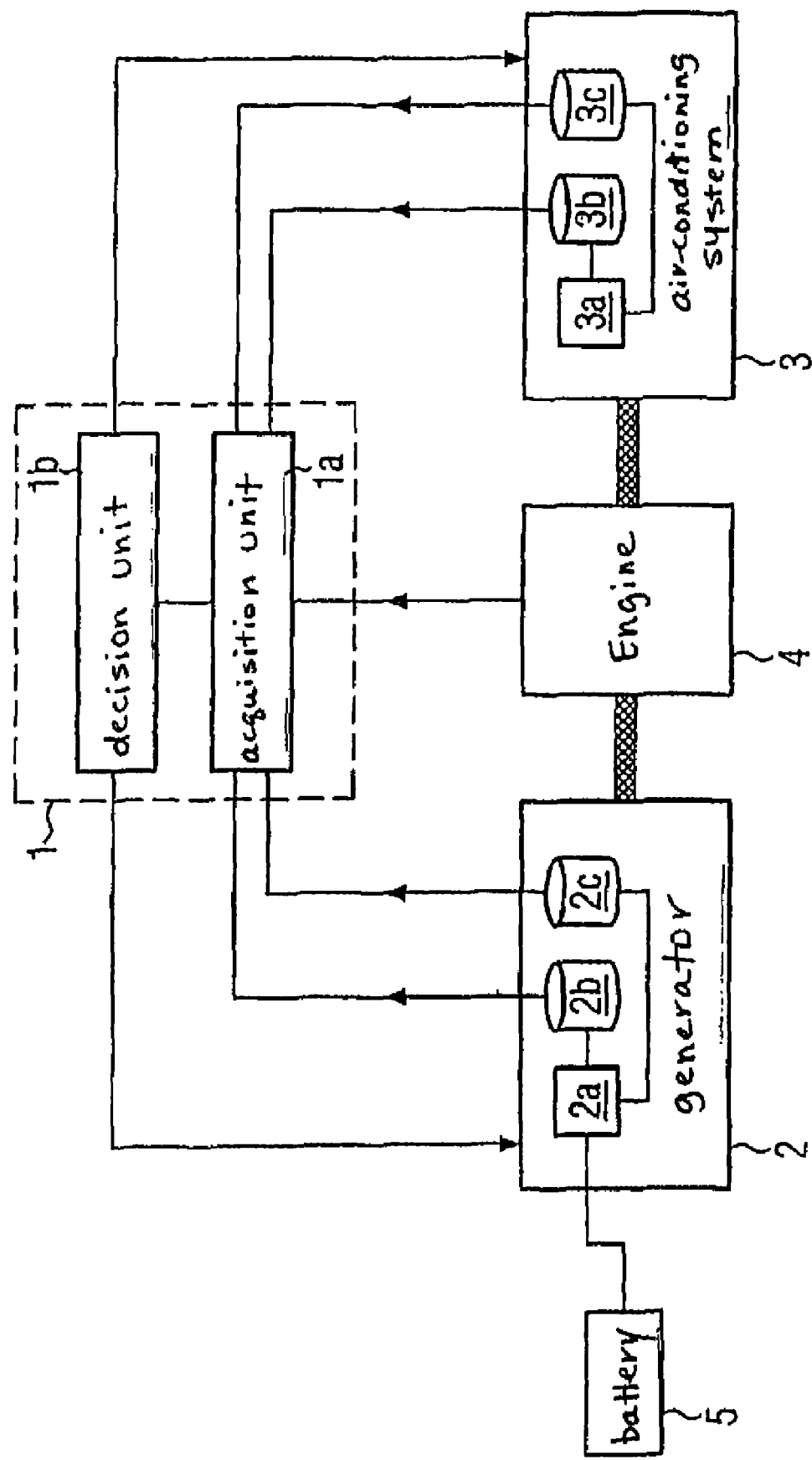
FIG. 1 is a block diagram of a preferred embodiment of the control unit according to the invention having two secondary units drivable by a principal unit according to preferred embodiments of the invention.

In the preferred embodiment illustrated in FIG. 1, the control unit 1 according to the invention consists of an acquisition unit 1a and of a decision unit 1b connected therewith. The control unit 1 coordinates the actuating of two secondary units, specifically a generator 2 and an air-conditioning system 3, which can be driven by a principal unit, specifically the internal-combustion engine 4 of the motor vehicle. The generator 2 is connected with a battery 5 and controls the charging of the battery 5. The acquisition unit 1a can acquire actual values of a demand buffer 2b of the generator 2 and of a demand buffer 3b of the air-conditioning system 3, a limit value buffer 2c of the generator 2 and a limit value buffer 3c of the air-conditioning system 3, and the condition of the internal-combustion engine 4. The acquisition unit 1a provides the acquired values to the decision unit 1b. The decision unit 1b controls the actuating of the generator 2 and of the air-conditioning system 3 on the basis of the acquired values.

In addition to the demand buffer 2b and the limit value buffer 2c, the generator 2 also has an acquisition unit 2a which acquires the charge condition of the battery 5 and writes it as an actual value into the demand buffer 2b. The limit value buffer 2c of the generator contains the limit values illustrated in FIG. 2b), of which max represents a completely charged battery; min represents a completely discharged battery; mandatory represents a value above min, below which the battery has to be charged in order not to be damaged; and optional represents a value above mandatory and below max, below which a charging of the battery makes sense for the additional storage of resources. These limit values can be used as a function of the type of battery. It is also contemplated that these limit values are changed over the life of the battery.

In addition to the limit value buffer 3c and the buffer memory 3b, the air-conditioning system 3 comprises an acquisition unit 3a which determines an actual value of resources of the air-conditioning system, for example, by means of the coolant temperature, the coolant pressure, the ambient temperature as well as the temperature of the vehicle interior, and writes it into the buffer memory 3b. The actual value determined by the acquisition unit 3a represents a "cooling reserve", whereby a cooling of the vehicle interior can take place by the air-conditioning system 3a without requiring that the latter be driven by the engine 4. The limit values shown in FIG. 2a with respect to the demand buffer 3b are stored in the limit value memory 3c of the air-conditioning system 3, max indicating a maximally storable cooling power, a value below max indicating a value starting at which the additional storage of cooling power makes sense, and min indicating a stored cooling power of zero. A mandatory value below min indicates that the air-conditioning system does not necessarily have to be operated. The acquisition unit 3a of the air-conditioning system 3 can determine the limit values as a function of the type of air-conditioning system 3 and/or also as a function of ambient parameters, such as the actual ambient temperature and the actual temperature of the vehicle interior.

In FIG. 2, the demand buffers 2b, 3b of the generator 2 and of the air-conditioning system 3, by way of an example, are represented as a receptacle, where a filling ratio represents the actual value. FIG. 2a illustrates the demand buffer 3b of the air-conditioning system, wherein the actual value is situated between the min value and the optional value. This means that the air-conditioning system 3 can be coupled to the engine 4 or can be uncoupled from the latter, which takes place, for example, as a function of the operating condition 4 of the engine. FIG. 2b shows the demand buffer 2b of the generator 2, thus, an actual value corresponding to the charge condition of the battery 5, which here is situated between the optional value and the max value, which indicates that a further charging of the battery is currently not meaningful.

FIG. 3 shows a flow chart of a preferred embodiment of the process taking place in the control unit 1 according to the invention using the example of controlling a secondary unit. In a first step S1, an initialization takes place during which the secondary unit is switched off and the limit values of the secondary unit are acquired. Subsequently, in a Step S2, the condition of the buffer of the secondary unit is acquired; thus the actual value is read out of the buffer memory. In case the corresponding secondary unit has variable limit values, as required, the limit values are acquired in the second Step S2, specifically when rapidly changing limited values are involved, as, for example, in the case of an air-conditioning system where the limit values are set as a function of the ambient temperature and of the temperature of the vehicle interior. In the case of slowly changing limit values, as, for example, limit values which change over the life of a battery, an acquisition of the limit values during the initialization in the first Step S1 is sufficient.

In a third Step S3 that follows the second Step S2, it is queried whether the actual value is smaller than or equal to the mandatory value. If this is so, the secondary unit is switched on in a fourth Step S4, after which the second Step S2 and the steps that follow are carried out again. If it is determined in the third Step S3 that the actual value is greater than the mandatory value, it is checked in a fifth Step S5 whether the actual value is smaller than or equal to the optional value. If this is not so, it is checked in a sixth Step S6 whether the actual value corresponds to the max value. If this is so, the secondary unit is switched off in a seventh Step S7 before the second Step S2 and the steps that follow are carried out again. If it is determined in the sixth Step S6 that the actual value does not correspond to the max value, the second Step S2 and the steps that follow are carried out immediately.

If it is determined in the fifth Step S5, that the actual value is smaller than or equal to the optional value, it is checked in an eighth Step S8 whether an additional load is advantageous for the principal unit. If this is so, the fourth Step S4 (switching-on of the secondary unit) is carried out with the steps that follow, and if this is not so, the seventh Step S7 (switching-off of the secondary unit) and the steps that follow are carried out.

Here, the switching-on of the secondary unit means a coupling of the secondary unit to the principal unit and a switching-off of the secondary unit is an uncoupling of the secondary unit from the principal unit.

Advantageously, a control takes place as to how much torque the secondary unit is to maximally take up.

The decision made in the eighth Step S8 as to whether an additional load is advantageous can be made as a function of many different parameters; for example, as a function of a priority set by the user, as a function of the condition of the principal unit, as a function of a prioritization of the corresponding secondary unit in comparison to other secondary units, as a function of a fuel supply, etc.

As a result of the actuating according to the invention, particularly of non-time-critical secondary units by the control unit according to the invention which knows the requirements of the individual secondary units and also the advantageous operating conditions of the principal unit, the limiting of the driving dynamics, the negative influencing of the fuel consumption, and the losses of comfort taking place as a result of a torque demand of a secondary unit can be eliminated or improved because they are optimally coordinated as a function of the driving condition. The control unit according to the invention may be further developed as an addition to the torque manager or as an independent decision entity, in which case not only the individual torque demands can be bundled but demands can also be advanced with respect to time, can be delayed or interrupted in order to be advantageously processed within the overall consideration.

The control of the air-conditioning compressor mentioned as an example, whose connection is not time-critical, may generate a longitudinally dynamic jerk, increase the fuel consumption, and reduce the available acceleration torque. For this reason, this secondary unit should advantageously be activated in phases of fuel cut-off in the overrun, of idling or of the constant to falling medium to high partial load and not during full-load accelerations, driving conditions with a rising load demand or a low partial load. A deactivation should also be possible in the latter cases.

So that it is ensured according to the invention that the individual demands of the respective secondary units are nevertheless taken into account, each secondary unit is equipped with a demand buffer or assigned to a demand buffer whose status is available to the control unit according to the invention and indicates how urgently the respective torque demand is to be carried out or how much leeway exists for a preferred actuating (for "replenishing" the buffer).

In the above-mentioned example of the air-conditioning compressor, the information of the buffer status, as indicated above, could be derived, for example, from the coolant temperature and/or the temperature of the vehicle interior. In the case of a generator regulator, the charging condition of the battery and also the actual current consumption could be used as the input quantity for calculating the buffer and thus as an indicator for the urgency or the amount of the required electric load or the possible electric load to be received.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for coordinating actuation of at least one secondary unit of a motor vehicle drivable by a principal unit of the motor vehicle, the control unit comprising:
   an acquisition unit that acquires limit values for actuation of the at least one secondary unit and an actual value of resources of the at least one secondary unit; and
   a decision unit operably coupled to the acquisition unit, the decision unit controlling actuation of the at least one secondary unit as a function of the acquired limit values of the secondary unit and the actual value of the secondary unit, wherein the acquisition unit acquires at least one of:

the actual value of the at least one secondary unit from a demand buffer; and the limit values of the at least one secondary unit from a limit value buffer.

2. A control unit for coordinating actuation of at least one secondary unit of a motor vehicle drivable by a principal unit of the motor vehicle, the control unit comprising:

an acquisition unit that acquires limit values for actuation of the at least one secondary unit and an actual value of resources of the at least one secondary unit; and a decision unit operably coupled to the acquisition unit, the decision unit controlling actuation of the at least one secondary unit as a function of the acquired limit values of the secondary unit and the actual value of the secondary unit, wherein the limit values of the secondary unit comprise:

a mandatory value, starting at which the secondary unit must be switched-on when the actual value falls below the mandatory value;

an optional value above the mandatory value, starting at which the secondary unit is optionally switched-on when the actual value falls below the optional value; and a max value greater than or equal to the optional value of the secondary unit, starting at which the secondary unit is switched-off when the actual value reaches the max value.

3. The control unit according to claim 1, wherein the acquisition unit acquires limit values and actual values of several secondary units, and further wherein the decision unit controls the actuation of all of the secondary units whose values were acquired.

4. The control unit according to claim 1, wherein the acquisition unit acquires a condition of the principal unit, and further wherein the decision unit controls the actuation of the at least one secondary unit corresponding to the acquired condition of the principal unit.

5. The control unit according to claim 2, wherein the acquisition unit acquires at least one of:

the actual value of the at least one secondary unit from a demand buffer; and the limit values of the at least one secondary unit from a limit value buffer.

6. The control unit according to claim 3, wherein the acquisition unit acquires at least one of:

the actual value of the at least one secondary unit from a demand buffer; and the limit values of the at least one secondary unit from a limit value buffer.

7. A process of coordinating actuation of at least one secondary unit of a motor vehicle drivable by a principal unit of the motor vehicle, the process comprising the acts of:

acquiring limit values for actuating the at least one secondary unit;

acquiring an actual value from resources of the at least one secondary unit; and controlling actuation of the at least one secondary unit as a function of the acquired limit values and the acquired actual value, wherein the act of controlling further comprises the acts of:

switching-on the secondary unit when the actual value of the secondary unit falls below a mandatory value of the secondary unit;

optionally switching-on the secondary unit when the actual value of the secondary unit falls below an optional value of the secondary unit, the optional value being greater than the mandatory value of the secondary unit; and switching-off the secondary unit when the actual value of the secondary unit reaches a max value of the secondary unit, the max value being greater than or equal to the optional value of the secondary unit.

8. The process according to claim 7, wherein the limit values and the actual value of several secondary units are acquired and actuation of all of those secondary units is controlled.

9. The process according to claim 7, further comprising the acts of:

acquiring a condition of the principal unit; and controlling the actuation of the at least one secondary unit in accordance with the acquired condition of the principal unit.

* * * * *